United States Patent
Emery

(10) Patent No.: US 6,361,632 B1
(45) Date of Patent: Mar. 26, 2002

(54) METHOD TO INCREASE COMPRESSIVE CREEP CAPABILITIES OF HIGH VOLTAGE COIL INSULATION

(75) Inventor: Franklin Timothy Emery, Ft. Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/448,658

(22) Filed: Nov. 24, 1999

(51) Int. Cl.$^7$ ............................................... H01B 13/26
(52) U.S. Cl. ........................... 156/56; 427/104; 427/116
(58) Field of Search ............................... 156/51, 52, 53, 156/56, 188, 190, 191; 310/45, 208; 428/324, 363; 174/120 R, 120 C; 427/104, 116

(56) References Cited

U.S. PATENT DOCUMENTS

| | | | |
|---|---|---|---|
| 2,601,243 A | 6/1952 | Botts et al. ................... 154/80 |
| 2,611,930 A | 9/1952 | Hill et al. ....................... 18/59 |
| 2,656,290 A | 10/1953 | Berberich et al. ......... 154/2.28 |
| 2,707,204 A | 4/1955 | Richardson et al. ........ 174/110 |
| 2,747,119 A | 5/1956 | Petersen et al. ............. 310/270 |
| 2,757,298 A | 7/1956 | Botts et al. .................. 310/208 |
| 2,959,699 A | 11/1960 | Smith et al. ................. 310/260 |
| 3,453,468 A | 7/1969 | Lund ........................... 310/180 |
| 3,531,751 A * | 9/1970 | Sargent ........................ 156/56 |
| 3,629,024 A * | 12/1971 | Kimura ........................ 156/56 |
| 3,735,168 A * | 5/1973 | Andersen et al. ............. 310/45 |
| 3,801,392 A | 4/1974 | Scheel et al. .................. 156/51 |
| 3,998,983 A | 12/1976 | Smith .......................... 427/374 |
| 4,013,987 A | 3/1977 | Foster ......................... 366/206 |
| 4,112,183 A | 9/1978 | Smith .......................... 428/363 |
| 4,214,932 A * | 7/1980 | Van Auken ................. 156/187 |
| 4,224,541 A | 9/1980 | Smith et al. ................... 310/45 |
| 4,265,966 A | 5/1981 | Schuh ......................... 428/324 |
| 4,296,018 A | 10/1981 | Smith et al. ............... 260/32.8 |
| 4,427,740 A | 1/1984 | Stackhouse et al. ......... 428/324 |
| 4,616,407 A | 10/1986 | Tamaki et al. ................. 29/596 |
| 4,622,116 A | 11/1986 | Elton et al. ............... 204/181.1 |
| 4,704,322 A | 11/1987 | Roberts ....................... 428/251 |
| 5,225,021 A * | 7/1993 | Lona ........................... 156/190 |
| 6,026,994 A1 * | 3/2001 | Shieh et al. ................. 156/172 |

* cited by examiner

Primary Examiner—Michael W. Ball
Assistant Examiner—John T. Haran

(57) ABSTRACT

A method and apparatus are provided to increase compressive creep capabilities of high voltage coil insulation. The method preferably includes applying at least one layer of a first tape as a groundwall insulation to substantially the entire length of a high voltage coil. The first tape preferably has a first predetermined amount of resin therein. The method also includes curing the groundwall insulation for a first predetermined time period, applying at least one layer of a second tape as a protective armor overlying the groundwall insulation only to end portions of the high voltage coil after the first predetermined time period. the second tape preferably includes substantially more resin than the first tape. The method further includes curing the protective armor for a second predetermined time period. The apparatus preferably includes a high voltage coil having a predetermined length, at least one layer of resin impregnated tape overlying the high voltage coil along substantially the entire predetermined length thereof and defining groundwall insulation, and at least one layer of resin rich (RR) tape overlying the groundwall insulation only along end portions of the coil to define a protective armor. The RR tape of the protective armor being impregnated with substantially more resin than the resin impregnated tape of the groundwall insulation.

12 Claims, 6 Drawing Sheets

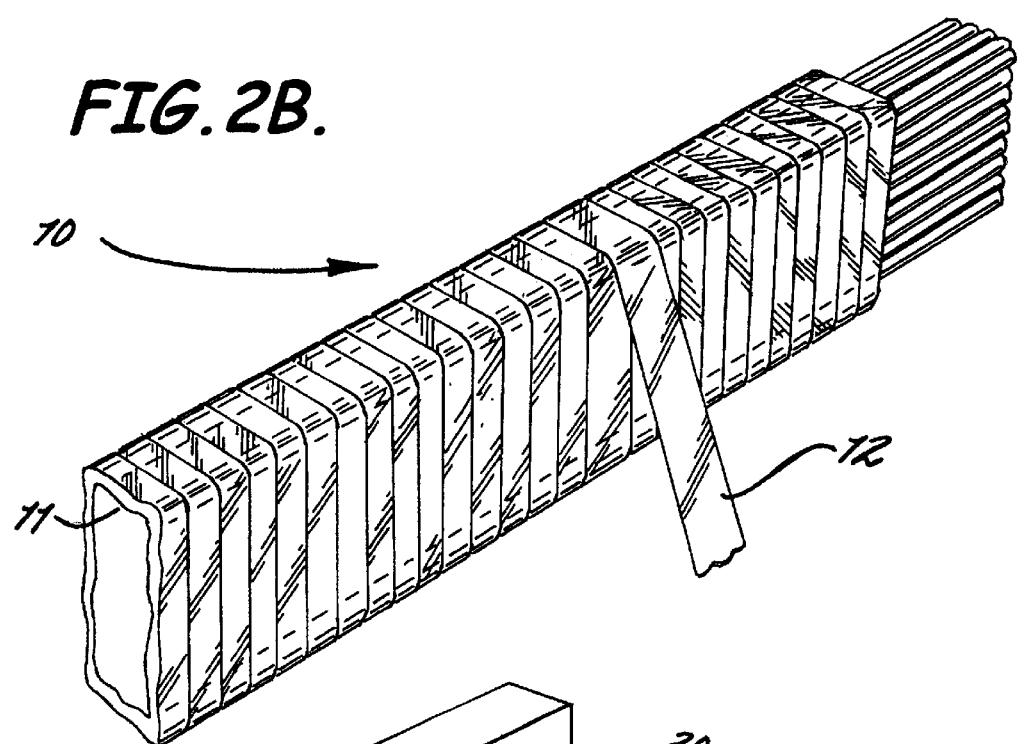
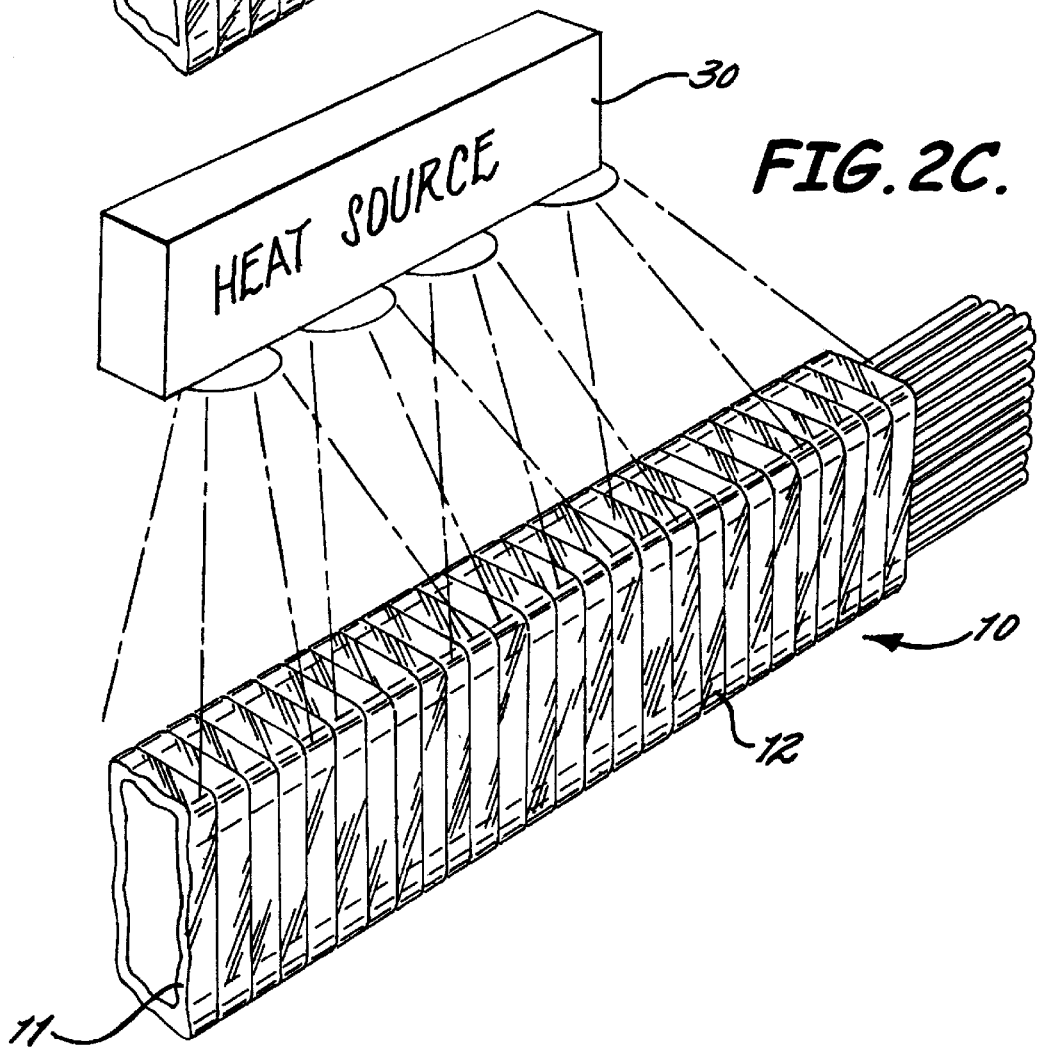

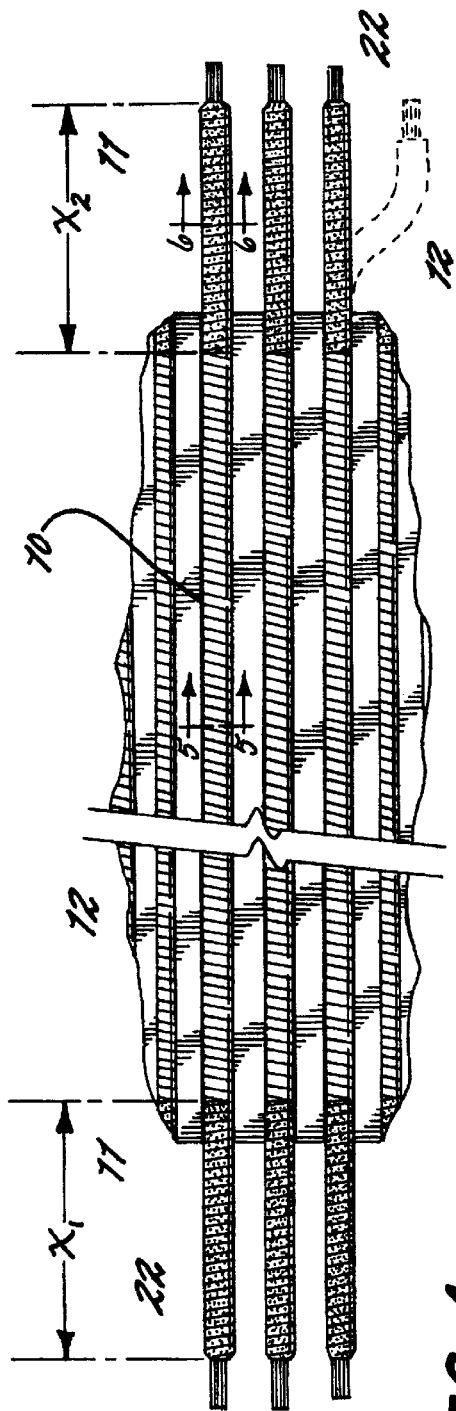
FIG. 4.
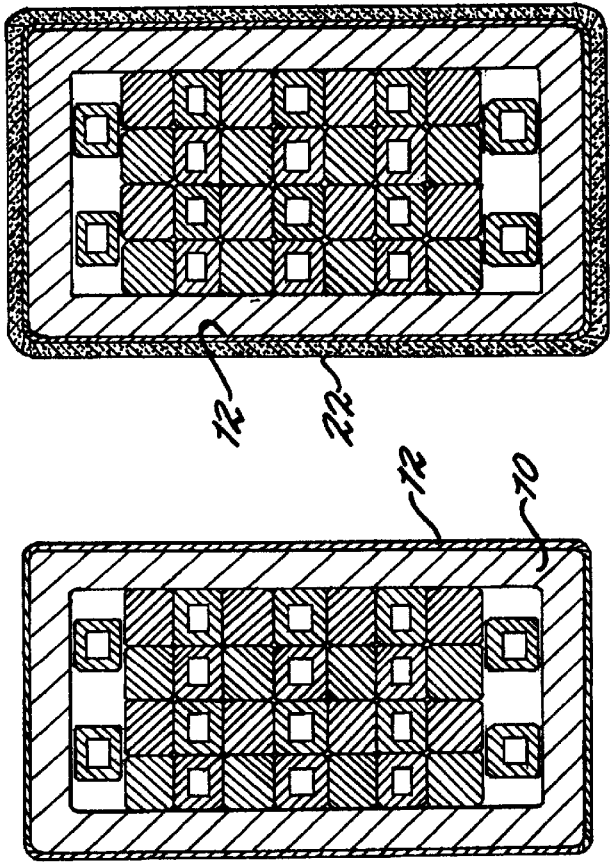
FIG. 5.
FIG. 6.

METHOD TO INCREASE COMPRESSIVE CREEP CAPABILITIES OF HIGH VOLTAGE COIL INSULATION

FIELD OF THE INVENTION

This invention is related to the power generation industry and, more particularly, to the field of power generators and coils for the same.

BACKGROUND OF THE INVENTION

In the power generation industry, high voltage coils are often used in stators of power generators. These coils often include one or more layers of groundwall insulation. This groundwall insulation is often formed of glass backed mica paper (GBMP) tape impregnated with an epoxy resin. Both electrical and mechanical requirements for these high voltage coils, however, can be difficult to meet with the conventional groundwall insulation systems. The end turn support and bracing components subjects the coil insulation to very high compressive forces. The straight or medial portions of the coil are less subject to such high compressive forces. The conventional epoxy resin impregnated GBMP tape, for example, is not suitable for compressive forces exceeding 3000 pounds per square inch (psi) at elevated temperatures. Separation of mica platelets can occur, for example, at high compressive forces. The small mica platelets are unable to maintain physical contact sufficiently to provide good mechanical strength and good dielectric strength.

Although resin rich (RR) tapes such as shown in U.S. Pat. No. 4,112,183 by Smith titled "Flexible Resin Rich Epoxide-Mica Winding Tape Insulation Containing Organo-Tin Catalysts," U.S. Pat. No. 4,296,018 by Smith titled "Catechol or Pyrogallol Containing Flexible Insulating Tape Having Low Gel Time," U.S. Pat. No. 4,224,541 by Smith titled "Fluid Solventless Epoxy-Anhydride Compositions Containing Metal Acetylacetonate Accelerators And Organic Carboxylic Acid Co-Accelerators For Use On An Electrical Member," and U.S. Pat. No. 4,704,322 by Roberts titled "Resin Rich Mica Tape," have been developed over the years for application to electrical members, such tapes are conventionally applied as a groundwall insulation and are rigid or stiff, bulky, and cause various problems as such a groundwall insulation. Even various curing and tape compositions have been attempted to strengthen such tapes or attempt to address some of the compressive creep problems with little or no success.

SUMMARY OF THE INVENTION

In view of the foregoing, the present invention advantageously provides a method and apparatus for increasing compressive creep capabilities of high voltage coil insulation. The present invention also advantageously provides a method and apparatus for increasing compressive creep capabilities of high voltage coil insulation without any change in the materials used in the groundwall insulation. The present invention further advantageously provides a method and apparatus for increasing compressive creep capabilities of high voltage coil insulation which provides significant protection to the groundwall insulation and substantially reduces instances of fractures to the groundwall insulation.

More particularly, the present invention provides a method for increasing compressive creep capabilities of high voltage coil insulation. The method preferably includes applying at least one layer of a first tape as a groundwall insulation to substantially the entire length of a high voltage coil. The first tape preferably has a first predetermined amount of resin therein. The method also includes curing the groundwall insulation for a first predetermined time period, applying at least one layer of a second tape as a protective armor overlying the groundwall insulation only to end portions of the high voltage coil after the first predetermined time period. The second tape preferably includes substantially more resin than the first tape. The method further includes curing the protective armor for a second predetermined time period.

The present invention also provides an apparatus to increase compressive creep capabilities of high voltage coil insulation which preferably includes a high voltage coil having a predetermined length, at least one layer of resin impregnated tape overlying the high voltage coil along substantially the entire predetermined length thereof and defining groundwall insulation, and at least one layer of resin rich (RR) tape overlying the groundwall insulation only along end portions thereof to define a protective armor. The RR tape of the protective armor being impregnated with substantially more resin than the resin impregnated tape of the groundwall insulation.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2B is a perspective view of a high voltage coil being wrapped with additional layers of glass backed mica paper tape as a ground insulation according to the present invention;

FIG. 2C is a perspective view of layers of glass backed mica paper tape as a ground insulation being cured through a heat process according to the present invention;

FIG. 4 is a fragmentary bottom elevational view of a plurality of high voltage coils having a protective armor of RR glass backed mica paper tape in preselected regions of a plurality of high voltage coils according to the present invention;

FIG. 5 is a sectional view of a high voltage coil having only a ground insulation and taken along line 5—5 of FIG. 4 according to the present invention;

FIG. 6 is a sectional view of a high voltage coil having a protective armor of RR glass backed mica paper tape over a ground insulation and taken along line 6—6 of FIG. 4 according to the present invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 2A:
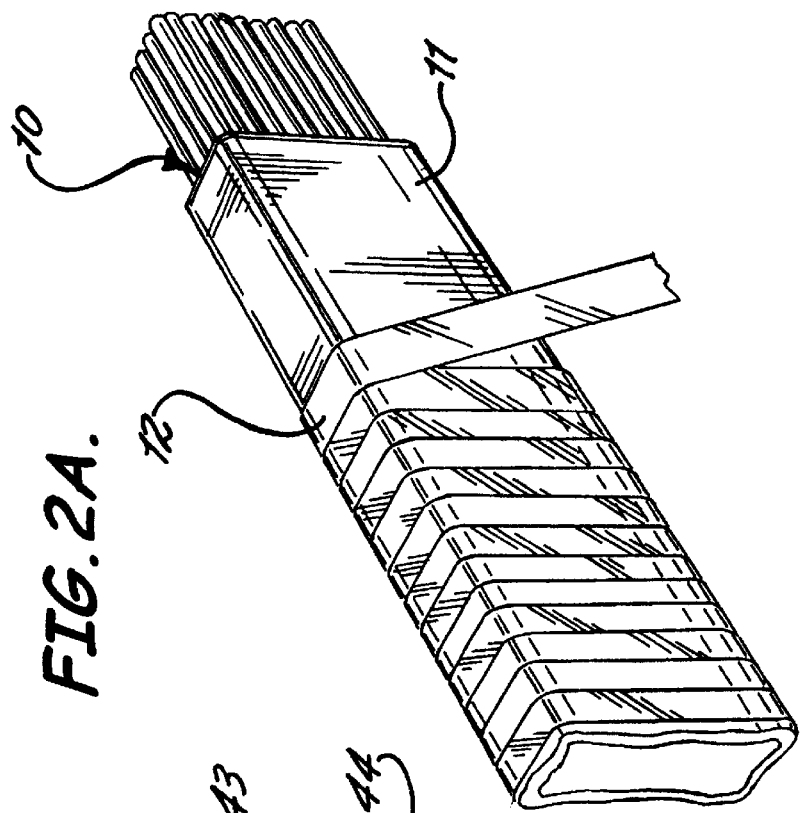
FIG. 2A is a perspective view of a high voltage coil being wrapped with a layer of glass backed mica paper tape as a ground insulation according to the present invention.
Figure 1:
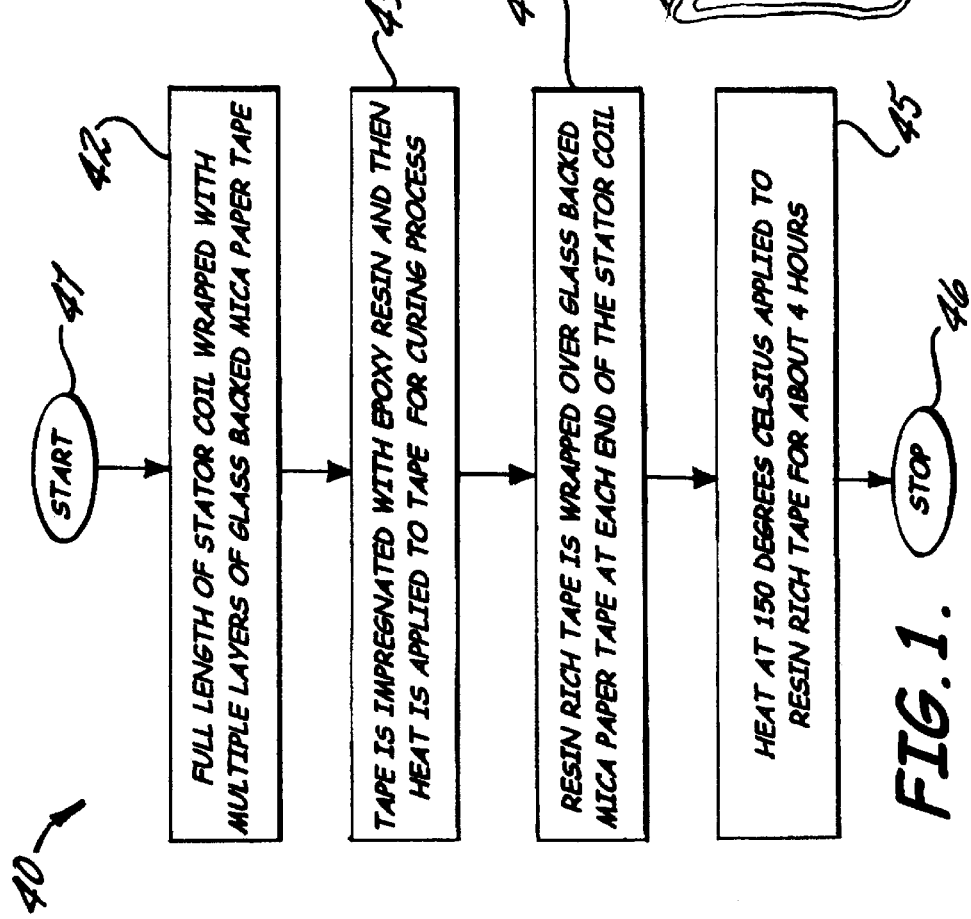
FIG. 1 is a schematic flow diagram of a method of increasing compressive creep capabilities of high voltage coil insulation according to the present invention.
Figure 3A:
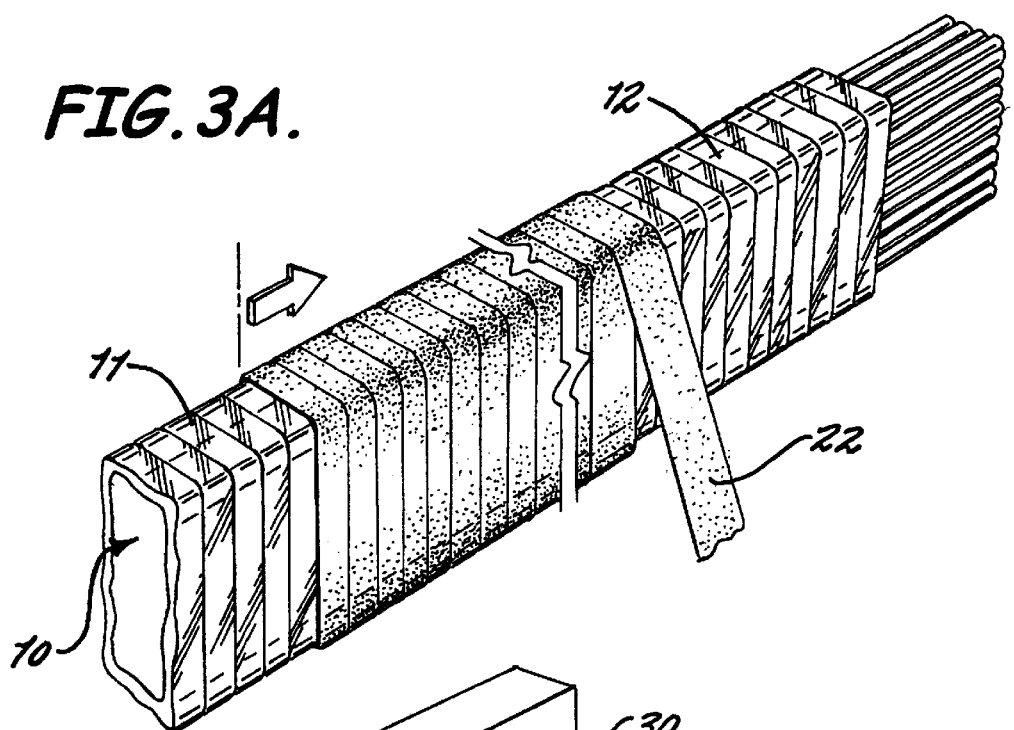
FIG. 3A is a perspective view of a resin rich (RR) glass backed mica paper tape being wrapped around the layers of the ground insulation as a protective armor in preselected regions of a high voltage coil according to the present invention.
Figure 3B:
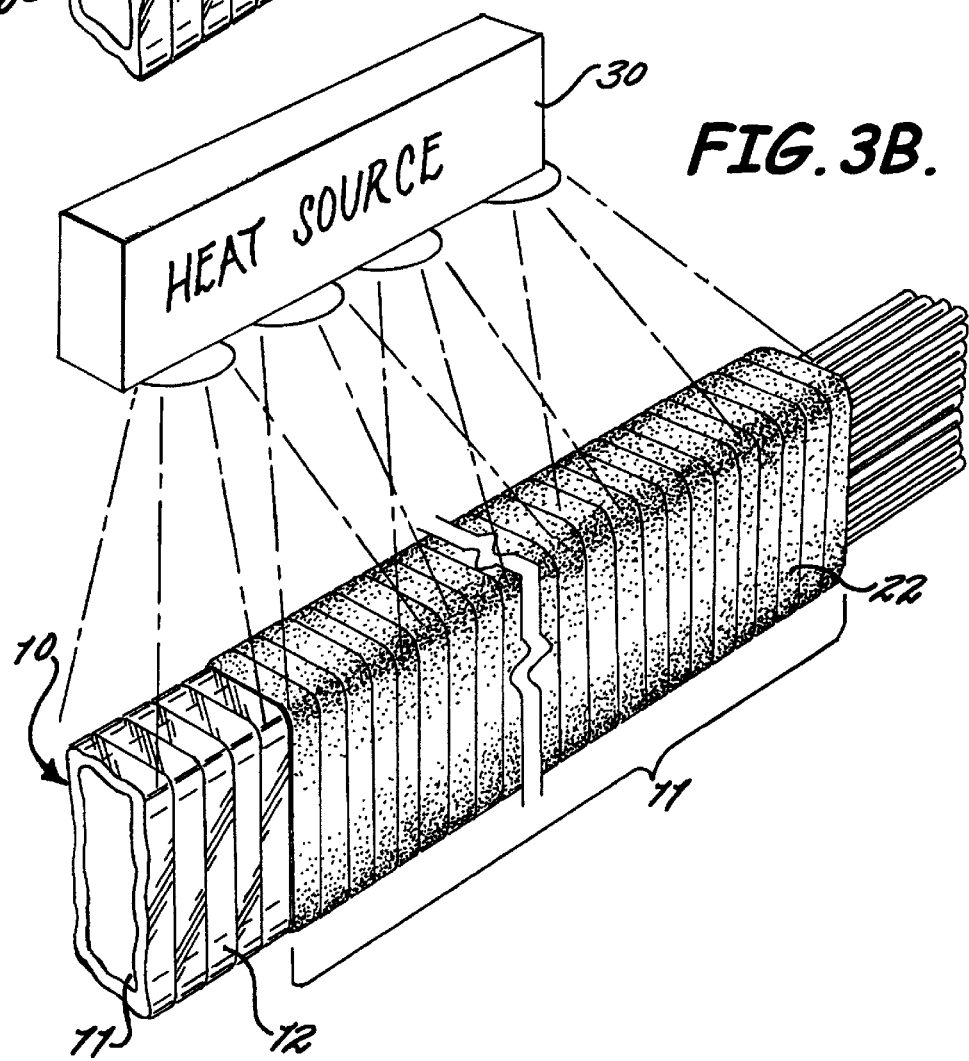
FIG. 3B is a perspective view of RR glass backed mica paper tape being cured through a separate heat process according to the present invention.
Figure 7:
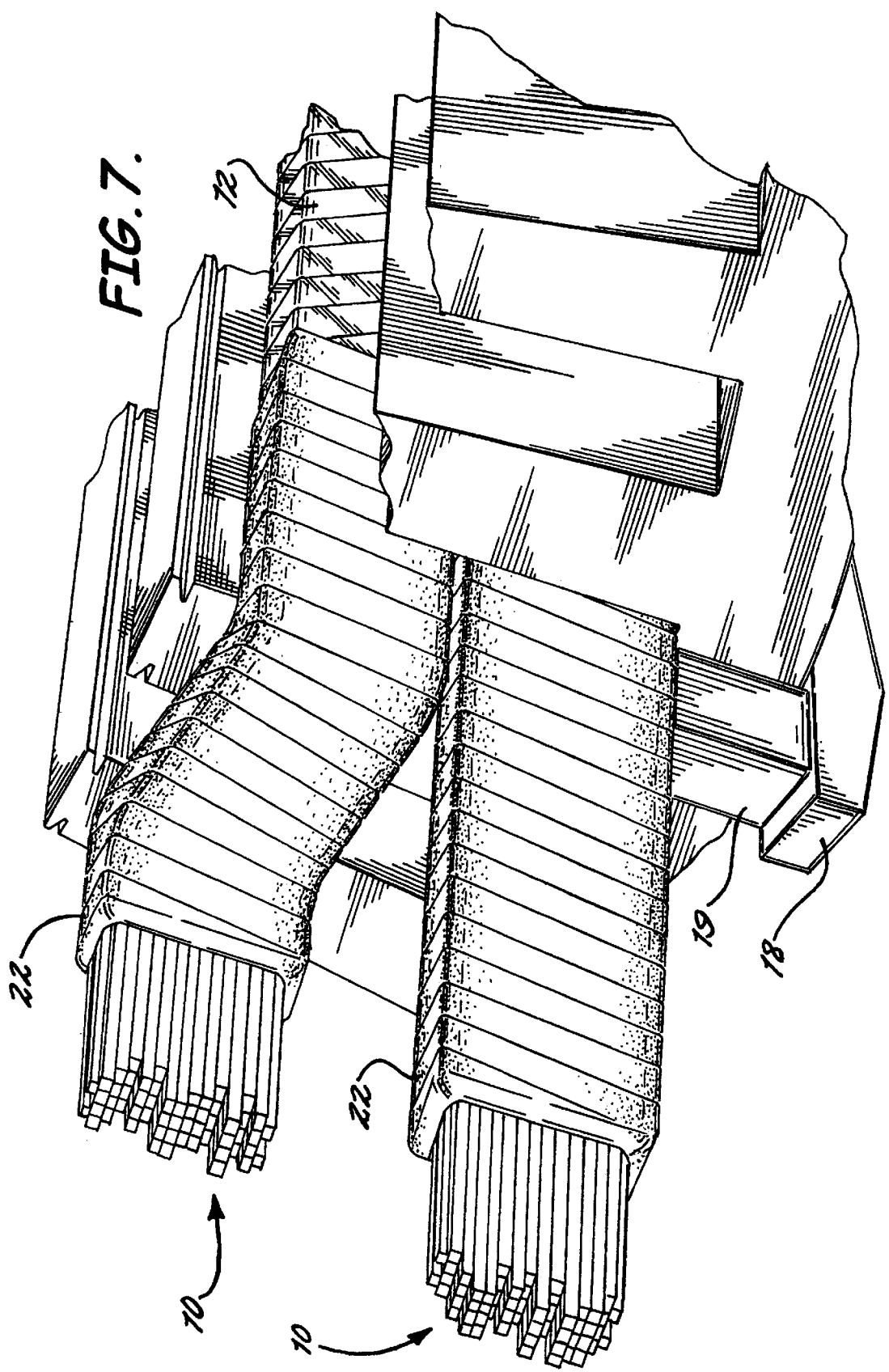
FIG. 7 is a fragmentary perspective view of a plurality of high voltage coils having a protective armor of RR glass backed mica paper tape over a ground insulation in preselected regions thereof according to the present invention.

As illustrated in FIGS. 1–8, and perhaps best in FIGS. 1–3B, the present invention provides a method 40 for increasing compressive creep capabilities of high voltage coil insulation (see FIG. 1). As the method is started or initiated (block 41), the method preferably includes applying at least one layer of a first tape 12 as a groundwall insulation to substantially the entire length of a high voltage coil 10 (block 42). After the first tape 12 is applied, the first tape 12 is then preferably impregnated with an epoxy resin and pressed to a desired size. The first tape 12 then preferably has a first predetermined amount of resin therein. The method also includes curing the groundwall insulation, e.g., by heat, for a first predetermined time period at a first predetermined temperature (block 43), applying at least one layer of a second tape 22 as a protective armor overlying the groundwall insulation only to end portions 11 of the high voltage coil after the first predetermined time period (block 44). The second tape 22 preferably includes substantially more resin than the first tape 12. The method further includes curing the protective armor for a second predetermined time period prior to installing the coil (blocks 45–46), e.g., heating at 150 degrees Celsius for about four (4) hours. The first tape 12 is preferably formed of a glass backed mica paper tape, and the second tape 22 is preferably formed of a resin rich (RR) glass backed mica paper tape.

The areas of particular concern in high voltage coils 10 where failures or creep problem arise, for example, are the point or region where the bottom coils end turn rest on the coil supports, e.g., coil support brackets 18 and one or more spacers 19 (see FIG. 7) and between the bottom and top coil end turns where the lattice thus formed is supported by resin rich glass separators or spacers placed between the top and bottom coils 10 as understood by those skilled in the art. The end turns or end portions 11 of the coils 10 are the only or primary region of the coil that are subject to high compressive loads. Also, because the groundwall insulation tape 12 and impregnating resin are selected to meet the dielectric requirements, the present invention advantageously does not require that the basic insulation design change to meet the compressive creep requirements.

The curing of the tape 22 of the protective armor preferably includes applying heat from a heat source 30 to the protective armor at a second predetermined temperature for a second predetermined period of time. The second predetermined temperature is preferably at least 150 degrees Celsius, and the predetermined period of time is at least four hours.

As perhaps best illustrated in FIGS. 4–7, the present invention also provides an apparatus to increase compressive creep capabilities of high voltage coil 10 insulation which preferably includes one or more high voltage coils 10 each having a predetermined length, at least one layer of resin impregnated tape 12 overlying the high voltage coil 10 along substantially the entire predetermined length thereof and defining groundwall insulation, and at least one layer of resin rich (RR) tape 22 overlying the groundwall insulation only along end portions 11 of the coil 10 to define a protective armor. The RR tape 22 of the protective armor is preferably impregnated with substantially more resin than the resin impregnated tape 12 of the groundwall insulation. For example, the tape 12 of the ground insulation preferably includes less than 30% resin by weight, e.g., preferably about 20–25%, once it has been impregnated, and the RR tape 22 of the protective armor preferably includes at least 50% resin by weight, e.g., preferably about 60–70%, as understood by those skilled in the art. In other words the original ground insulation tape, i.e., the first tape 12, has epoxy resin of about 6–7% by weight, e.g., grams per meter squared or pounds per square inch, and then is impregnated with additional epoxy resin as described to raise the level of resin within the groundwall insulation tape to about 20–25% by weight. The RR tape 22 of the protective armor is also preferably applied or wrapped as one or more half-lapped layers of the RR tape 22 along the end portions 11 of the high voltage coil 10 and is positioned on and abuttingly contacts an outer layer of the tape 12 of the groundwall insulation as illustrated.

Figure 8:
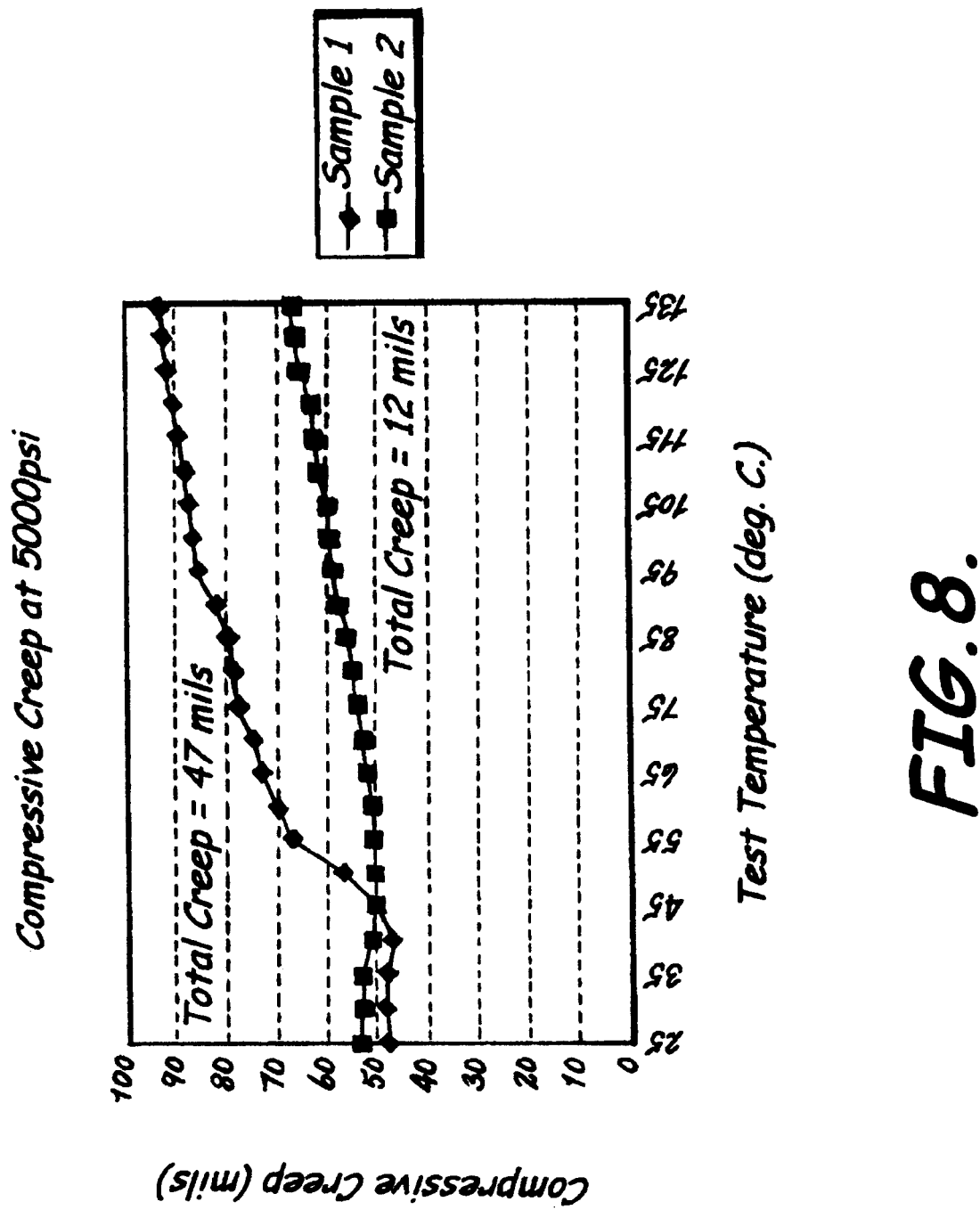
FIG. 8 is a graph of compressive creep over temperature at a high compressive pressure, e.g., 5000 psi, according to the present invention.

As illustrated in the graph of FIG. 8, sample coils 10 were fabricated and processed for examples of the methods and apparatus of the present invention. Full size coils were made and were subject to a series of electrical tests. Following the electrical testing, a mechanical compression test was developed, and the samples were subjected to extensive testing. Compressive creep tests were conducted on the samples. A special fixture was fabricated to simulate the physical arrangement in which the coil is subject to in the actual winding.

The special fixture was designed to load the coil insulation on the top and bottom surface of the coil 10 at a maximum pressure of 5000 psi with 8000 pounds applied to the fixture. The fixture was designed to load the coil insulation to simulate the pressure as applied to the coils. The fixture with the coil sample was designed to fit in a hydraulic press that could also heat the sample to a temperature in excess of 135 degrees Celsius. The pressure applied to the sample was automatically regulated to maintain a constant pressure during the compressive creep test. A dial type micrometer was used to measure the compressive creep as the sample temperature was raised from 25 degrees Celsius to the maximum test temperature of 135 degrees Celsius. Following the compression of the groundwall insulation for the candidate samples, foil electrodes were applied to the test area and an AC hi-pot test was conducted. The objective was to have the candidate sample hold 11 kvrms for a full minute. If the sample passed, it was re-tested at 15 kVrms for one minute. Compressive creep plots were made for each sample tested as shown in FIG. 8. The samples that had excessive creep at low temperature in the temperature cycle were eliminated early in the testing program.

As shown in FIG. 8, Sample 1 is normal groundwall insulation. Coil sections were fabricated using an epoxy resin and GBMP tape 12. The compressive creep resulted in a total creep of 47 mils at a temperature of 135 degrees Celsius. Several fractures occurred in the groundwall insulation, and Sample 1 failed the AC hi-pot test at 8 kVrms on the way up to 11 kvrms.

Sample 2 included the RR tape 22 of the protective armor of the present invention. Using the same groundwall insulation system as in Sample 1, and following the normal cure cycle for the sample, a single half lap layer of glass backed mica paper resin rich (RR) tape 22, with a high glass transition temperature (Tg), was applied over the epoxy resin-GBMP tape 12 of the groundwall insulation and cured at 150 degrees Celsius for four (4) hours. Following the compressive creep test, the creep protected sample having the protective armor had a total compression of 12 mils at 135 degrees Celsius. Sample 2 held 15 kVrms for a full minute. It was found that significant protection to the groundwall insulation was obtainable through the use of the single layer of RR tape 22 applied over the conventional groundwall insulation. No fracturing of the groundwall insulation was found.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That claimed is:

1. A method of increasing compressive creep capabilities of high voltage coil insulation, the method comprising the steps of:

applying at least one layer of a first tape as a groundwall insulation to substantially the entire length of a high voltage coil, the first tape having a first predetermined amount of resin therein;

curing the groundwall insulation for a first predetermined time period;

applying at least one layer of a second tape, said second tape comprising a glass backed mica paper tape, as a protective armor overlying the cured groundwall insulation only to end portions of the high voltage coil after the first predetermined time period, the second tape including a second predetermined amount of resin and the second predetermined amount of resin being substantially more than the first predetermined amount of resin; and curing the protective armor for a second predetermined time period.

2. A method as defined in claim 1, wherein the first tape comprises a glass backed mica paper tape and the second tape comprises a resin rich (RR) glass backed mica paper tape.

3. A method as defined in claim 1, wherein the step of curing the protective armor includes the steps of applying heat to the protective armor at a predetermined temperature for a predetermined period of time.

4. A method as defined in claim 3, wherein the predetermined temperature is at least 150 degrees Celsius, and wherein the predetermined period of time is at least four hours.

5. A method of increasing compressive creep capabilities of high voltage coil insulation, the method comprising the steps of:

applying at least one layer of a first tape as a groundwall insulation to substantially the entire length of a high voltage coil, the first tape having a predetermined amount of resin impregnated therein; and applying at least one layer of a second tape, said second tape comprising a glass backed mica paper tape, as a protective armor overlying the cured groundwall insulation at least to end portions of the high voltage coil, the second tape including substantially more resin impregnated therein than the first tape.

6. A method as defined in claim 5, further comprising separately curing the second tape of the protective armor from the first tape of the groundwall insulation.

7. A method as defined in claim 6, wherein the first tape comprises glass backed mica paper.

8. A method of increasing compressive creep capabilities of high voltage coil insulation, the method comprising the steps of:

applying at least one layer of glass backed mica paper (GBMP) tape as a groundwall insulation to substantially the entire length of a high voltage coil, the GBMP tape including less than 30% resin; and applying at least one layer of resin rich (RR) glass backed mica paper (GBMP) tape as a protective armor overlying the groundwall insulation only to end portions of the high voltage coil, the RR GBMP tape including at least 50% resin.

9. A method as defined in claim 8, further comprising the step of curing the groundwall insulation prior to the step of applying at least one layer of RR GBMP tape.

10. A method as defined in claim 9, further comprising curing the protective armor separate from the curing of the groundwall insulation.

11. A method as defined in claim 10, wherein the step of curing the protective armor includes the steps of applying heat to the protective armor at a predetermined temperature for a predetermined period of time.

12. A method as defined in claim 11, wherein the predetermined temperature is at least 150 degrees Celsius, and wherein the predetermined period of time is at least four hours.

* * * * *